United States Patent [19]

McInerney

[11] Patent Number: 4,655,043
[45] Date of Patent: Apr. 7, 1987

[54] TURBOCHARGER

[75] Inventor: Charles E. McInerney, Rolling Hills Estates, Calif.

[73] Assignee: The Garrett Corporation, Los Angeles, Calif.

[21] Appl. No.: 827,981

[22] Filed: Feb. 10, 1986

Related U.S. Application Data

[62] Division of Ser. No. 498,228, May 26, 1983, Pat. No. 4,613,288.

[51] Int. Cl.⁴ .......................................... F02B 37/00
[52] U.S. Cl. ................................................. 60/602
[58] Field of Search ................ 60/600, 601, 602, 603

[56] References Cited

U.S. PATENT DOCUMENTS 4,120,156 10/1978 McInerney ........................... 60/602

Primary Examiner—Douglas Hart
Attorney, Agent, or Firm—J. Henry Muetterties; Albert J. Miller

[57] ABSTRACT

A lightweight, compact turbocharger for small internal combustion engines having a reduced number of component parts for simplified construction, an improved bearing structure and a novel means of transmitting control pressure to the actuator.

17 Claims, 10 Drawing Figures

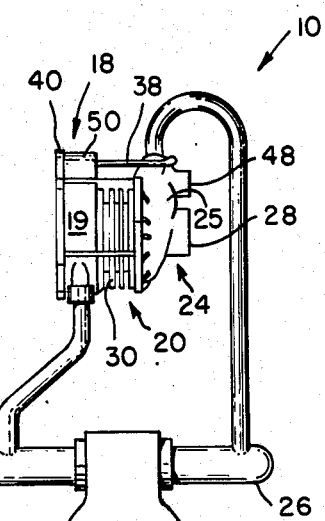
Fig. 1.
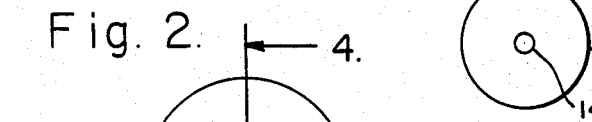
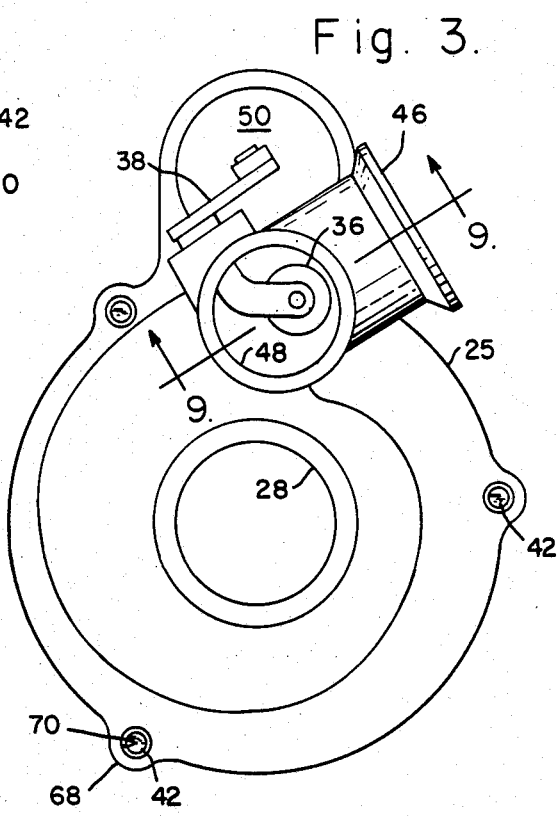
Fig. 2.
Fig. 3.

TURBOCHARGER

This is a division of application Ser. No. 498,228 filed May 26, 1983, and now U.S. Pat. No. 4,613,288, issued Sept. 23, 1986.

BACKGROUND OF THE INVENTION

This invention relates generally to an improved turbocharger design. Turbochargers in general are well known in the art for supplying relatively high pressure air, commonly referred to as charge air, to the intake manifold of an internal combustion engine, such as a reciprocating piston engine of the type commonly used to power automobiles, trucks, buses and the like. Typically, the turbocharger comprises a turbine housing connected for receiving exhaust gases expelled from the engine and configured for guiding those exhaust gases into driving communication with a rotating turbine wheel. The turbine wheel is carried by a rotatable shaft connected to a compressor impeller within a compressor housing. The turbine wheel thus rotatable drives the compressor impeller which in turn draws ambient air into the compressor housing for compression and discharge in the form of charge air supplied to the intake manifold of the engine.

Typically the rotating shaft in a turbocharger is capable of being driven at relatively high rotational speeds, such as on the order of about 120,000 rpm or more. Thus, the shaft connecting the turbine wheel and compressor impeller must be supported by suitable journal bearings and thrust bearings within a center housing connected between the turbine housing and the compressor housing. Normally, lubricating oil from the engine is commonly pumped under pressure to the turbocharger center housing for lubricating the shaft bearing so as to prevent excessive bearing heating and wear.

Turbocharged engines are highly advantageous when compared with conventional naturally aspirated engines in that substantially denser air can be delivered to the combustion chamber or cylinders of the engine. This increased air density or mass permits the engine to be operated at substantially increased levels of peformance and power output, and frequently with greater efficiency. In this regard, however, it is necessary to control the operation of the turbocharger so that the charge air is supplied to the engine only on demand at a pressure level not exceeding a predetermined design limit. While a variety of control schemes are known, it is conventional to provide a passage for bypassing exhaust gases around the turbine wheel and including a so called wastegate valve for opening and closing this bypass passage.

As turbochargers find increasing use on smaller and smaller automobile engines, it is necessary that they be lighter, more compact, and less costly to build. Simply scaling down a conventional turbocharger has not proven to be an effective, cost efficient way of producing these smaller turbochargers.

SUMMARY OF THE INVENTION

The present invention is directed to a unique, low cost, lightweight and compact turbocharger. While certain of the features of a conventional turbocharger have, of necessity, been retained, this small turbocharger represents a number of radical departures from conventional practice. The number of component parts has been minimized so as to significantly reduce overall manufacturing and material cost. The construction has likewise been totally simplified towards this same end.

The bolted turbocharger structure utilizes an open housing turbine volute closed by a wheel shroud and an open housing compressor volute closed by a thrust/diffuser plate, disposed at opposite ends of a finned center housing having generally the same outer dimensions. An annular ring at the compressor end of the turbocharger, part of the bolted assemblage, includes internal passages to transmit control pressure to the turbocharger actuator.

The invention also contemplates improved bearing structure and method for supporting the shaft which utilizes a minimum number of components, many of which perform multiple functions, and arranged and configured for simple, rapid assemblage. More particularly, a full floating journal bearing of relatively soft material is supported to the housing through a cast iron bearing carrier. Further, the journal bearing operates in conjunction with associated thrust plates or washers for generating one or more thrust bearings to support the shaft adjacent axial loads. The thrust/diffuser plate may be utilized to provide axial securement for the bearing assembly, and is also configured and arranged to inhibit oil migration from the bearing area to the compressor section.

Various other objects and advantages of the present invention are specifically set forth in or will become apparent from the following detailed description of a preferred embodiment of the invention when read in conjunction with the accompanying drawings.

BRIEF DESCRIPTION OF THE DRAWINGS

FIG. 1 is a schematic illustration of the turbocharger of the present invention shown operably coupled to an internal combustion engine;

FIG. 2 is a compressor end view of the turbocharger of the present invention;

FIG. 3 is a turbine end view of the turbocharger of the present invention;

DETAILED DESCRIPTION OF THE PREFERRED EMBODIMENTS

Figure 4:
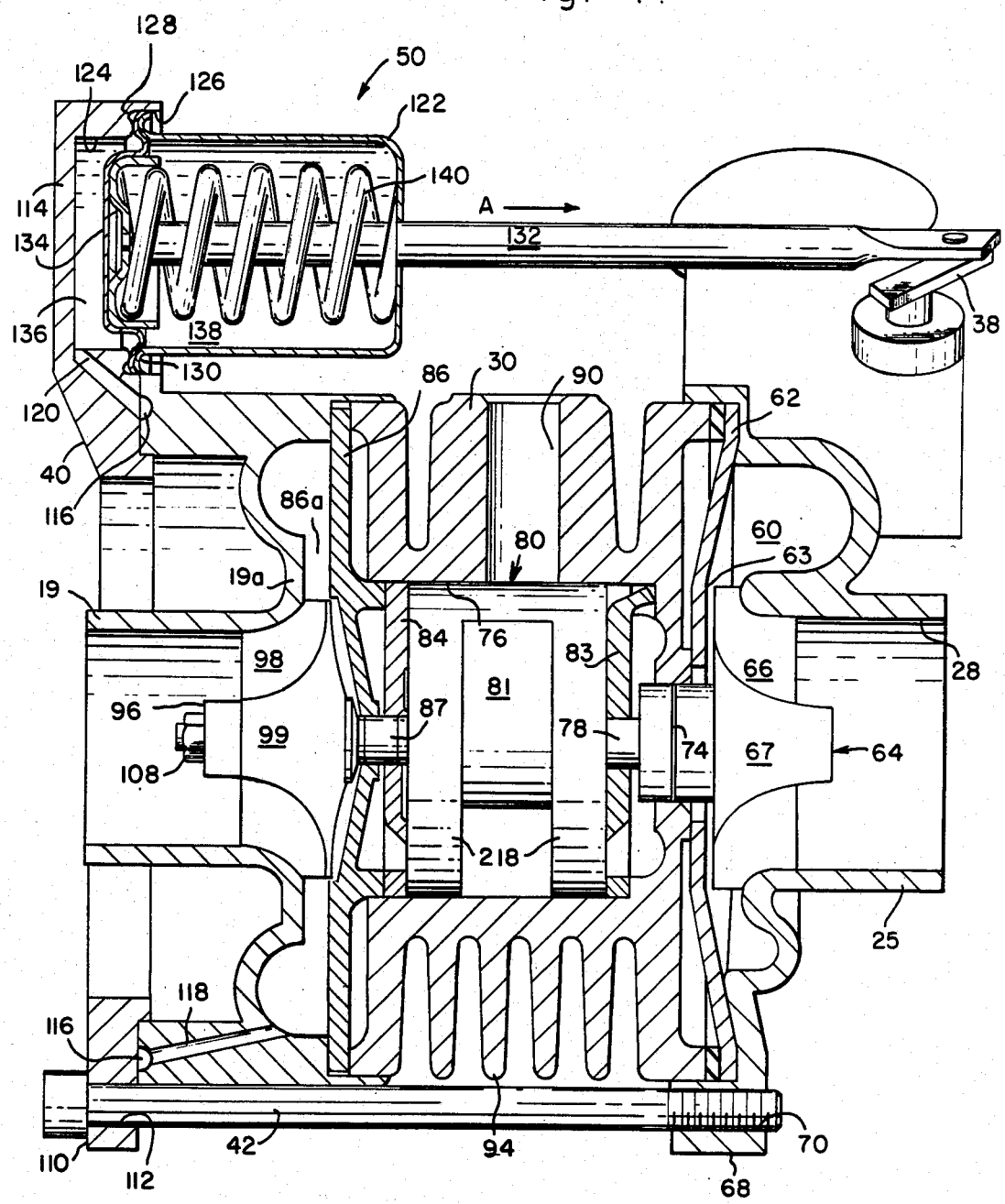
FIG. 4 is a cross-sectional view of the turbocharger taken along line 4—4 of FIG. 2.

A turbocharged engine system 10 is shown in FIGS. 1-4, and generally comprises a combustion engine 12, such as a gasoline or diesel powered internal combustion engine having a plurality of combustion cylinders (not shown), for rotatably driving an engine crankshaft 14. The engine 12 includes an air intake conduit or manifold 16 through which air is supplied by means of a compressor 18 of the turbocharger 20. In operation, the compressor 18 draws in ambient air through an air inlet 22 in a compressor housing 19 and compresses the air with a rotatable compressor impeller wheel 96 to form so called charge air for supply to the engine for combustion purposes.

Exhaust products are discharged from the engine through an exhaust conduit or manifold 26 for supply to a turbine 24 of the turbocharger 20. The discharge exhaust gases rotatably drive a turbine wheel 64 within the turbine housing 25 of turbine 24 at a relatively high rotational speed to correspondingly drive the compressor wheel within the compressor housing 19. In this regard, the turbine and the compressor wheels are carried for simultaneous rotation on a common shaft 78 supported within a center housing 30. After driving communication with the turbine wheel, the exhaust gases are discharged from the turbocharger 20 to an exhaust conduit 28 which may conveniently include pollution or noise abatement equipment as desired.

Circumferentially disposed around the outer end of the compressor housing 19 is a ring 40 through which a plurality of bolts 42 extend through to the turbine housing 25 to hold the assemblage of the turbine housing 25, center housing 30, and compressor housing 19 together. However, it should be noted that the compressor housing 19 is not fixed in relation to either the ring 40 or the turbine housing 25. Prior to tightening of the bolts 42, the compressor housing 19 can be rotated 360° about its axis within ring 40. This feature allows the user to position the compressor outlet 44 in any desired angular relationship with respect to the turbine inlet 46. Ring 40 also serves to position the turbocharger control actuator 50 which together with linkage 38 operates a bypass or wastegate valve (shown in FIG. 9) to control the bypass of exhaust gases around the turbine wheel. The ring 40 provides compressor pressure to the actuator 50 which controls the opening and closing of the bypass valve through linkage 38. With the bypass flow path closed, all of the engine exhaust gases are circulated through the turbine 24 in driving communication with the turbine wheel whereby the turbocharger is capable of developing substantial charge air boost pressure. However, when the bypass flow path is opened, a portion of the engine exhaust gases bypass the turbine wheel whereby the ability of the turbocharger to develop substantial charge air is decreased or limited.

More details of construction of the turbocharger 20 of the present invention are provided in FIGS. 2–4. In FIG. 2, for example, the compressor end view, there is illustrated the circumferential ring 40 together with the heads of bolts 42. Also illustrated is the compressor inlet 22 and compressor discharge 44. The turbine end of the turbocharger, as shown in FIG. 3, illustrates the opposite ends of the bolts 42 as screwed in or otherwise attached to the turbine housing 25. The turbine inlet 46 and turbine exhaust 28 are also shown as is the wastegate valve 36 controlled by linkage 38 from actuator 50. The exhaust passage 48 for the bypassed exhaust gases from the turbine is also shown. It would be conventional for the turbine outlet 28 and exhaust passage 48 to be joined together into a single exhaust system for the engine.

As illustrated in FIG. 4, the turbine housing 25 is generally of a cast or stamped open volute construction with the open side of the volute 60 closed by as disc-shaped heat shield 62. Because of the high temperatures associated with the exhaust gases from the internal combustion engine, both the turbine housing 25 and heat shield 62 must be fabricated from a high temperature material such as steel. During operation of the turbocharger, the heat shield 62 is exposed to exhaust gas temperatures which cause slight expansion and deflection of the heat shield 62. This expansion can cause what is known as "oil-canning" of the shield; i.e. popping out or deflection of the unsupported portion of the heat shield in the direction of least pressure. In order to reduce the deflection of the unsupported portion of the shield, the shield has been formed with a slight bend or crimp 63 therein. This bend 63 is directed toward the center housing 30 and away from the turbine wheel 64 in order to bias any "oil-canning" of the heat shield 62 in this direction. Additionally, the likelihood and magnitude of this deflection is reduced by the very nature of the turbine volute section since the area of contact between the turbine housing 25 and perimeter of the heat shield 62 increases circumferentially around the volute. Disposed to rotate within the turbine housing 25 and receive exhaust gases from the volute 60 is a turbine wheel 64 having blades 66 disposed a hub 67. Disposed at raised positions around the outer periphery of the turbine housing 25 are a plurality of outwardly extending bosses 68, each boss 68 having a threaded opening 70.

More particularly, the open volute construction contemplates, as shown, an annular, semi-circularly curved section whose maximum cross-sectional area in a plane perpendicular to the rotational axis of the turbine wheel 64. As depicted by comparing the upper and lower portions of the shown volute section, the maximum cross-sectional area smoothly varies in a circumferential direction. Importantly, one entire side of the volute section is completely open substantially at the points of maximum cross-sectional area at substantially all circumferential locations, i.e., as a fully open, semi-circular construction, greatly facilitating clean-up of the interior volute walls of the cast or stamped turbine housing.

The outer periphery of heat shield 62 is held against the open side of the volute 60 by the outer periphery of the closed or turbine end of the generally cup-shaped center housing 30. This center housing 30 may be of a die cast construction and be fabricated from a material such as aluminum. The closed or turbine end of center housing 30 includes an opening through which the hub 67 of the turbine wheel extends. Around this opening is disposed an axially projecting boss extending towards the turbine wheel which serves to position the radially inner periphery of the heat shield 62 behind the turbine wheel 64. A seal in the form of piston ring 74 is provided between the opening in the closed end of the center housing and a turbine hub 67 so as to prevent the passage of exhaust gases into the center housing, or the passage of lubricating oil from the interior of the cup-shaped center housing into the turbine housing.

The compressor end of center housing 30 is the open end of the generally cup-shaped interior thereof, presenting a cylindrical, smooth cylinder wall 76. A plurality of radially extending fins 94 are provided around the outer periphery of center housing 30 about the central axis of the turbocharger so that regardless of physical orientation, convection air will readily cool the center housing.

Like the turbine 24, the compressor housing 19 is also of a generally open volute configuration as described in greater detail with respect to the turbine housing. Since, however, it is operating in a relatively low temperature environment, it can be of a material such as die cast aluminum. The compressor, which may also be of aluminum, includes a compressor impeller 96 having blades 98 and a hub 99, and is rotatably disposed within the compressor housing 19. The shaft 78 which is affixed to the hub 67 of the turbine impeller 64, extends through the generally cup-shaped central opening in the center housing, as well as through the compressor hub 99 in an opening therein. The compressor wheel 96 is affixed to shaft 78 by means of a threaded nut 108.

Figure 5:
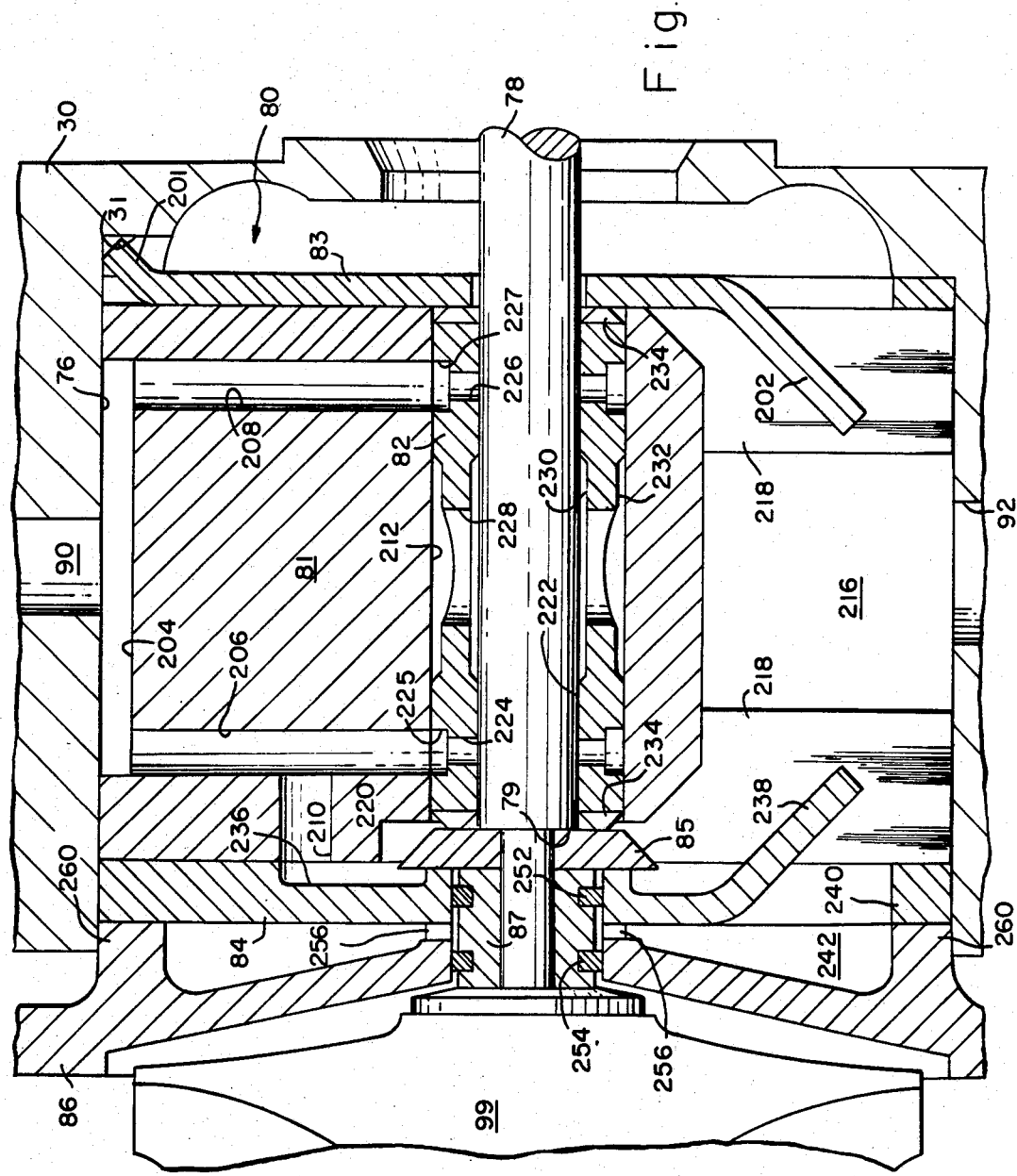
FIG. 5 is an enlarged cross-section view of the central bearing area.

Referring to FIGS. 4 and 5, disposed within the bnterior cylindrical wall 76 of the center housing 30 is a bearing assembly generally denoted by the numeral 80. Bearing assembly 80 includes a bearing carrier 81 of cast iron based metal or other relatively hard material in comparison to the aluminum center housing; journal bearing of aluminum or other soft material of a general sleeve configuration 82; a thrust bearing plate 83 of relatively soft material at the turbine end of the housing; a thrust bearing 84 of relatively hard material disposed generally towards the compressor end; a thrust washer 85 of hard material affixed to the shaft and disposed between thrust bearing 84 and journal bearing sleeve 82; a diffuser thrust plate 86 disposed between compressor impeller 96 and thrust bearing 84; and a thrust spacer 87 located immediately adjacent shaft 78 and extending axially from compressor impeller hub 99 to thrust washer 85.

It will be noted that diffuser thrust plate 86 serves to close the open end of the compressor volute in a manner similar to heat shield 62. Further, as shown in FIG. 4, the outer flat, annular section of diffuser/thrust plate 86 closing the volute also extends radially inwardly parallel to a diffuser section 19-a of the compressor housing to define therewith a radial diffuser space 86-a communicating the outlet of the compressor wheel with the volute portion of the compressor housing.

Diffuser thrust plate 86 is carried by and secured to compressor housing 19 at the outer periphery of the diffuser thrust plate 86. Thrust washer 85 and thrust spacer 87 are carried for rotation with shaft 78 by virtue of the compression force exerted upon tightening of threaded nut 108 which forces thrust spacer 87 and thrust washer 85 rigidly against the stepped shoulder 79 of the shaft 78. Thrust bearing 84, bearing carrier 81 and turbine end bearing plate 83 are all generally cylindrical in configuration, slipping readily within cylindrical wall 76 to which they snugly fit to be guided therein, and are each constrained against rotation within cylindrical wall 76 as described in greater detail below. In contrast, journal bearing sleeve 82 is of the full floating type, not being constrained against rotation.

Referring now more particularly to FIG. 5, turbine end bearing plate 83 is of generally circular configuration having a central opening through which the shaft 78 readily extends. Bearing plate 83 acts to deter oil migration towards the turbine; however, plate 83 also includes a stamped and bent lower leg like portion 202 serving as a oil deflector for directing lubricating oil back toward the centrally located drain outlet 92. Additionally, turbine end bearing plate 83 operates in combination with floating journal bearing 82 for providing a thrust bearing action as will be described in greater detail below. Plate 83 includes an outwardly bent tab 201 received within a mating notch 31 in center housing 30 to secure plate 83 against rotation relative to the center housing.

Bearing carrier 81 is of a generally circular shape slipping readily within cylindrical wall 76 as noted previously, and includes an axially extending groove 204 and a pair of radial bores 206 and 208 for feeding lubricating oil from inlet 90 to journal bearing 82. Additionally, bearing carrier 81 includes an axial bore 210 for feeding lubricating oil to the thrust bearing as described in greater detail below. The cast iron bearing carrier 81 has a central through bore 212 for receiving journal bearing 82. Bores 206 and 208 open perpendicularly onto bore 212 to provide relatively large openings thereon. It is important to note that central bore 212 is smooth, characterized by the absence of grooving for stabilizing the shaft. Instead, the large openings 206 and 208 provide pressure loading of bearing 82 to minimize shaft motion; yet because bores 206 and 208 are perpendicular to bore 212, there is minimal end leakage of lubricating oil through bore 212 in comparison to prior art arrangements wherein the lubricating feed bores are angled relative to the central shaft. Such prior art arrangements suffered either from excessive end leakage because of the resulting elliptically elongated opening of the oil feed bores, or required grooving on the bore 212 to promote pressure loading to minimize shaft motion while permitting smaller oil feed bores.

Figure 6:
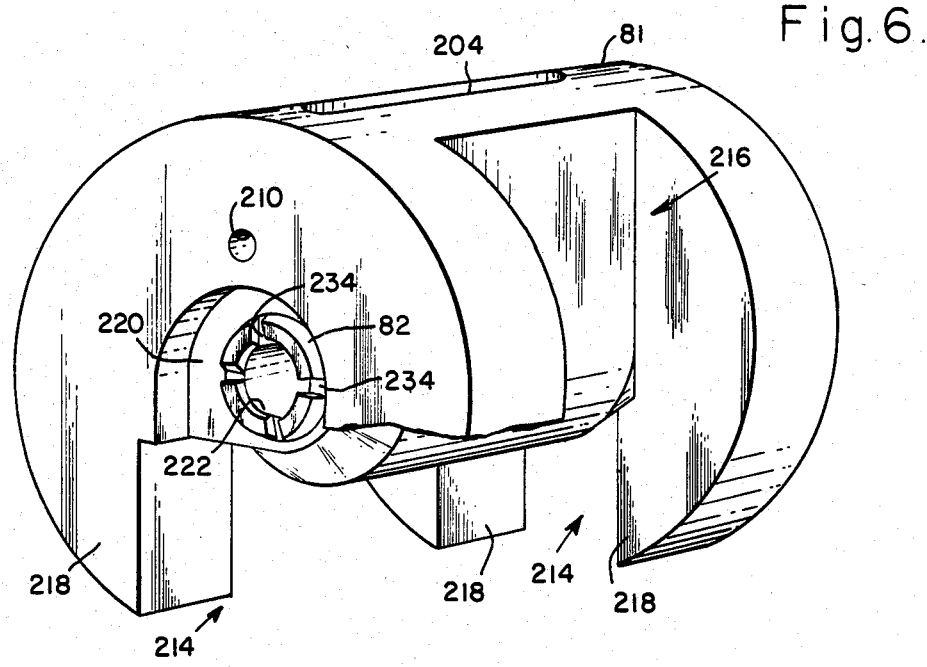
FIG. 6 is a perspective end view of the bearing carrier and journal bearing.

As best shown in FIG. 6, bearing carrier 81 has a relatively large, axially extending opening 214, as well as a similar transverse opening 216 for both weight reduction and for presenting a reservoir for the drain of lubricating oil. As a result, the lower portion of bearing carrier 81 forms four generally downwardly extending leg-like portions 218. Bearing carrier 81 further includes a relief 220 at the compressor bearing end thereof for facilitating lubricating oil drainage. Opening 214 at the compressor end snugly receives bent oil deflector portion 202 of plate 83 to thereby constrain bearing carrier 81 against rotation relative to plate 83 and compressor housing 30.

As noted, journal bearing 82 is of the full floating type and is of a general sleeve configuration with a central through bore 222 closely fitting the shaft 78. Journal bearing 82 includes a plurality of oil lubricating bores 224 and 226 generally aligned with similar passages 206 and 208 and communicating therewith through continuous peripheral grooves 225 and 227, as well as openings 228, and reliefs 230 and 232 for forming alternating lands and grooves. The lands, of course, present the primary journal bearing surfaces for the rotating shaft 78. The various lands and grooves on the general bearing 82 are relatively configured and arranged so as to produce a hydrodynamic fluid film bearing for supporting and journaling the axial shaft 78.

It is important to note that both ends of journal bearing 82 have oil feed cross grooves 234 therein for facilitating support against thrust end loads in the turbocharger. Thus, the turbine end of journal bearing 82 acts in conjunction with bearing plate 83 to present an oil film thrust bearing therebetween for assisting in supporting thrust loads in a direction towards the turbine, since bearing 82 is carried to rotate with the shaft, but at a slower speed, and thus rotates relative to stationary plate 83. Thus, as noted previously the turbine end bearing plate 83 also operates in conjunction with the full floating bearing 82 to present an end load thrust bearing.

Figure 7:
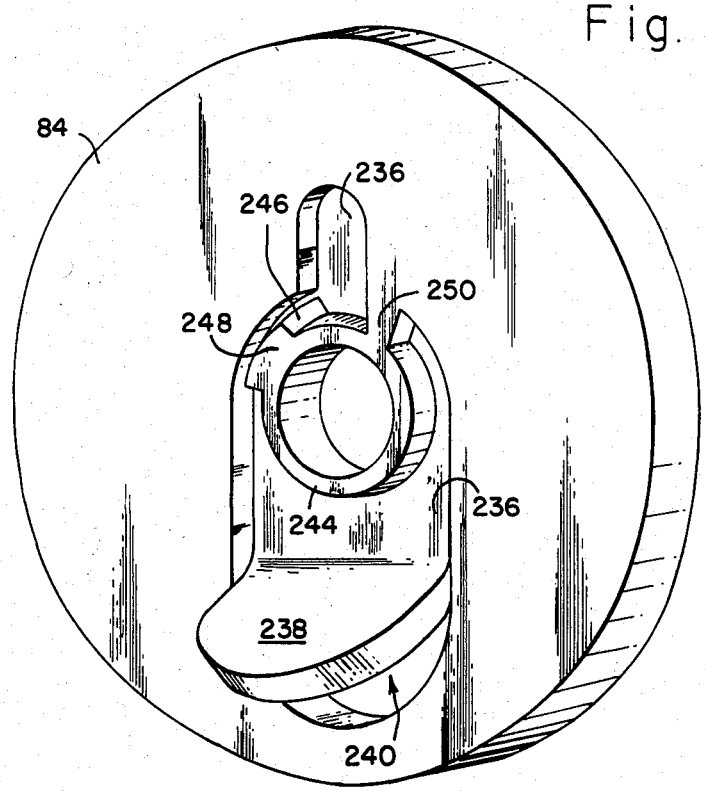
FIG. 7 is a perspective view of the center portion of the face of the thrust bearing plate facing the bearing carrier.

Referring to FIGS. 5 and 7, thrust bearing 84 includes a relief 236 on the face thereof mating with bearing carrier 81 so as to present an opening passage for lubricating oil to pass from passage 210 through relief 236 to relief 220 in bearing carrier 81 and ultimately to the compressor end grooves 234 on general bearing 82. Toward its lower end, as illustrated in both FIG. 5 and FIG. 7, the thrust bearing 87 also includes a stamped, bent oil deflector section 238, similar to deflector 202 of end plate 83, for assisting in directing lubricating oil away from the compressor end and toward oil outlet 92. Importantly, the deflector 238 also presents an opening 240 in the thrust bearing plate.84 for permitting open fluid communication between the open space 242 between diffuser thrust plate 86 and thrust bearing 84, and the interior bore 76 such that any lubricating oil which goes into space 242 is directly communicable with oil outlet 92. Similar to oil deflector 202, deflector 238 fits within opening 214 at the compressor side to be restrained against rotation relative to bearing carrier 81, plate 83, and compressor housing 30.

As clearly illustrated in FIG. 7, the configuration of thrust bearing plate 84 further includes a relatively thin angular ring section 244 immediately adjacent the rotating thrust washer 85. A ramped depression 246 extends, in the same direction as the rotational direction of shaft 78, axially toward and joins with an extended portion 248 of the annular ring or island section 244. On the opposite side of relief 236 is another bridge 250 forming another extension of the annular island 244. Together the ramp portion 246, annular island 244, and the bridge portions 248 and 250 present a configuration for developing a hydrodynamic thrust bearing thereat based upon introduction of a fluid film from the lubricating oil. This thrust bearing operates to generate a hydrodynamic fluid film between the face of annular island 244 and the rotating thrust washer 85 so as to support the assembly against thrust loads directed towards the compressor end of the turbocharger. Bridge 250 inhibits lubricating fluid flow around the right side, as viewed in FIG. 7, of the land 244 toward opening 240, and thus promotes fluid flow along ramp 246 to the thrust bearing surfaces. Similarly, extended land or bridge 248 minimizes dumping of high volume lubricating flow around the left side of land 244.

Thrust washer 85 is of flange hardened material with one of its opposing faces adjacent the thrust bearing end of the journal bearing 82, and its other end adjacent the ring section 244 of thrust bearing 84. At the opposite side of thrust washer 85, the lubricating oil fed through grooves 234 and journal bearing 82 also act as a thrust bearing assembly since, as described, bearing 82 rotates relative to washer 85.

Thrust spacer 87 carries in grooves therein a pair of seals in the form of piston rings 252, 254 which respectively align with the central bores of thrust bearing plate 84 and diffuser thrust plate 86. Piston rings 252, 254 act to impede the flow of lubricating oil from the central bearing area to the compressor, as well as to impede airflow from the compressor section into the central bearing area.

Figure 8:
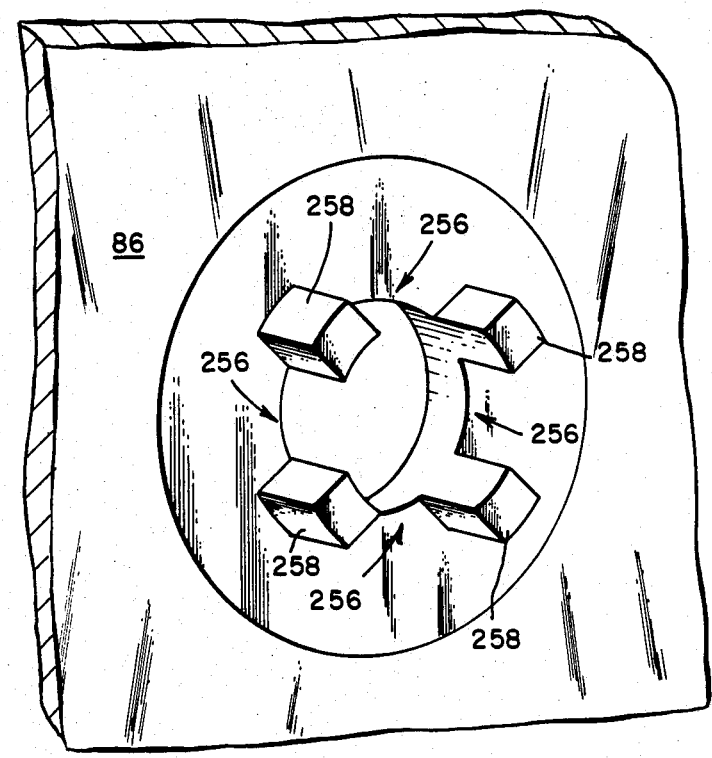
FIG. 8 is a fragmentary perspective view of the central portion of the thrust/diffuser plate.

To further facilitate separation of air and oil between the compressor and the bearing section of the turbocharger, diffuser thrust plate 86 includes a plurality of openings 256 near the central area thereof for communicating the space 242 with the space between piston seals 252 and 254. Openings 256 are best illustrated in FIG. 8. Openings 256 between spacer spokes 258 on the diffuser thrust plate 86 allow oil to drain out of the space between piston rings 252 and 254 back into space 242 and ultimately to oil outlet 92. This arrangement is particularly useful in preventing migration of lubricating oil into the compressor section. Additionally, this arrangement is also especially useful in the rare instance of pressure reversal wherein the pressure within space 242 and the central bearing area exceeds the pressure in the compressor section. In such instance the space 242 near the central area and close to openings 256 is generally an air pocket with little or no oil therein. Thus, in the instance of temporary pressure reversal, air or light oil vapor within space 242 tends to be sucked back towards and across piston ring 254 rather than oil. Accordingly, the present arrangement enhances prevention of oil migration to the compressor section even upon temporary, transient pressure reversal conditions.

Diffuser/thrust plate 86 also includes an axially extending boss 260 snugly fitted, piloted, and guided within cylinder wall 76. As noted, the outer periphery of plate 86 is clamped by compressor housing 19 to prevent rotation thereof relative to the housings and the remainder of bearing assembly 80. Yet, the entire bearing assembly 80, including plate 86, is piloted by the same cylindrical wall 76 to maintain concentricity of the assembly. But at the same time, the axial clamping, holding force for assembly 80 is provided by the several bolts 42, the clamping load being transmitted from the annular ring 40 through the compressor housing 19 through the periphery of plate 86 to its center boss 260, to bearing plate 84, bearing carrier 81, and turbine end bearing plate 83. As desired, a sealant may be included between boss 260 and cylindrical wall 76 to minimize lubrication leakage to the compressor section. The overall arrangement of bearing assembly 80 provides a compact, extremely economical bearing arrangement for the turbocharger. Each of the components performs several duties as described above, thus minimizing the number components and simplifying assembly dramatically.

Of particular note is the thrust bearing arrangement provided at opposite ends of floating, rotating journal bearing 82. At both these ends, the thrust bearing action is to support the turbocharger against thrust directed toward the turbine end. In automotive applications of such a turbocharger, wherein wastegate 36 is operable during a significant portion of the duty cycle, the thrust bearing surfaces for supporting against thrust directed toward the turbine end experience substantially greater duty, than the surfaces supporting thrust directed toward the compressor. In the present invention, the duty of supporting against this turbine-directed thrust is shared by the thrust bearings formed at the two ends of the journal bearing. Furthermore, the relative rotational speeds at both ends are less, since journal bearing 82 is freely rotating at a lower intermediate speed in comparison to shaft speed.

Referring now to FIGS. 1-4 again, the annular ring 40 is disposed around the outer end of the compressor housing 19 and includes a plurality of radially projecting bosses 110, each of which includes a opening 112. The openings 112 in this ring 40 are axially aligned with the threaded openings 70 in the turbine housing 25. The bolts 42 extend through the openings 112 and are threadably engaged with the opening 70 in the turbine housing to hold together the turbine and compressor around the center housing. Integral with the ring 40 is the actuator cover 114. A circumferential passage 116 is provided between the exterior of the compressor housing 19 and the ring 40, and this passage is exposed to the compressor volute by means of passage 118. The circumferential passage 116 is connected to the interior of the actuator cover by means of passage 120. The passages 116, 118, 120 together serve to transmit compressor pressure to the interior of the actuator cover.

Figure 9:
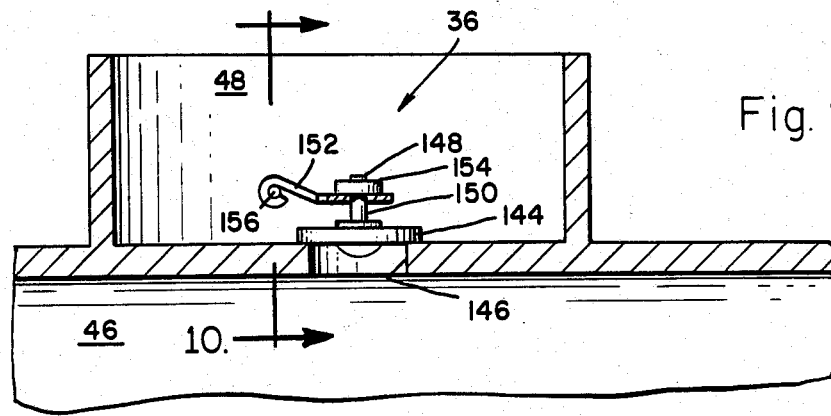
FIG. 9 is an enlarged fragmented horizontal section taken on the line 9—9 of FIG. 3.
Figure 10:
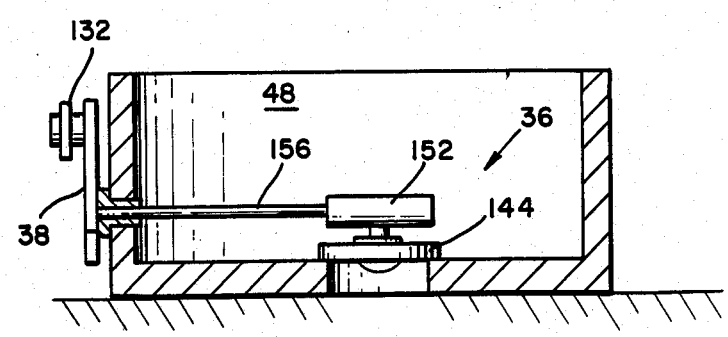
FIG. 10 is an enlarged vertical section taken along line 10—10 of FIG. 9.

The turbocharger control actuator 50 is shown in FIG. 2 for controllably moving the wastegate valve 36 (shown in FIGS. 9 and 10 in response to variations and the engine speed or load. As shown, the actuator 50 comprises a cap 122 attached to the actuator cover 114 thereby forming an actuator housing. The actuator cover 114 has a first bore 124 and a concentric enlarged bore 126 therein. The bores 124 and 126 are separated by an annular transition section 128. The transition section 128 can be further modified by either having an annular groove formed therein next to the wall defining the enlarged bore 126 or by forming a sinusoidal or S-shaped transition section as shown in FIG. 2. The cover 114 has a passage 120 therein flow connecting the first bore 124 and the circumferential passage 116.

The actuator cap 122 is generally cylindrical in shape and has an open and closed end. The edge of the open end is rolled back outwardly upon itself to form a rolled lip 130. The rolled lip of the actuator cap is pressed into the actuator cover 114 and wedges itself into the enlarged bore 126 securing the cap 122 to the cover 114. The closed end has a substantially concentric aperture therein for passage of an actuator rod 132 therethrough.

Within the actuator housing is an internal flexible diaphragm 134 dividing the housing interior into two isolated chambers; actuator pressure chamber 136 and chamber 138. The actuator rod 132 is coupled to the diaphragm 134, and extends through the chamber 138 and through the aperture in the closed end of the cap 122 for connection to the wastegate valve 36. A spring 140 within the chamber serves to bias the diaphragm 134 and the rod 132 against movement toward the wastegate valve 36. Chamber 138 is vented to the ambient air pressure. Actuator pressure chamber 136 is connected to the compressor discharge pressure via passage 120, the circumferential passage 116 and passage 118. When the pressure in the actuator pressure chamber 136 reaches a level predetermined by the mechanical characteristics of the spring 140, the diaphragm 134 flexes against the spring to carry the actuator rod 132 in the same direction. Of course, when the pressure in the pressure drops off, the reverse action occurs.

As shown in FIG. 2, a linkage system 38 connects the actuator rod 132 to the waste gate valve 36. Movement of the actuator rod 132, which is operably connected to the spring biased diaphragm 134, serves to control the opening and closing of the waste gate valve 36 thereby allowing exhaust gases from the turbine housing gas inlet flow 46 through bleed hole 146 bypassing the turbine 24. Specifically, the waste gate valve 36 comprises a substantially flat circular-shaped valve head 144 having a diameter larger than the diameter of the bleed hole 146. The valve head 144 is secured by a rivet 148 to one end of a valve stem 150 extending rearwardly from the valve head 144 into the bypass chamber 48. A metal strip 152 is relatively loosely received over the stem 150 adjacent to valve head 144 and a washer 154 fixed on the rear end of the valve stem 150. The metal strip 152 extends generally upwardly from the valve stem 150 and is wrapped around and fixed at its upper end as by welding to one end of shaft 156. The shaft 156 extends through the side wall of the discharge housing, and has its outwardly extending end secured to one end of the crank link 38. The other end of the crank link is pivotally connected to actuator rod 132.

As shown in FIG. 9, the actuator rod 132 is shifted in the direction of arrow A, the crank link 38 is pivoted to rotate the shaft 156 about its own axis in a direction counter clockwise as viewed in FIG. 10. Rotation of shaft 156 carries the metal strip 152 away from contact with the valve head 144, and thereby allows exhaust gases from turbine housing gas inlet 46 to blow the valve head 144 away from its seated position on the turbine housing 25 opening the bleed hole 146. In this manner, exhaust gases are allowed to bypass the turbine 24, whereby the turbine is no longer driven at maximum speed to correspondingly reduce compressor boost pressure. The volumetric flow rate of exhaust gases bypassing the turbine wheel is dependent upon the degree of opening of the waste gate valve 36 with respect to the bleed hole 146.

Various modifications to the depicted and described method and apparatus will be apparent to those skilled in the art. Accordingly, the foregoing detailed description of the preferred embodiment of the invention should be considered exemplary in nature, and not as limiting to the scope and spirit of the invention as set forth in the appended claims.

Having described the invention with sufficient clarity that those skilled in the art may practice it, I claim:

1. A method of providing turbocharger compressor outlet pressure to a turbocharger actuator comprising the steps of:
   forming a circumferential fluid passageway between the compressor housing and an annular ring disposed around the compressor housing;
   exposing the circumferential fluid passageway to compressor housing pressure; and
   exposing the turbocharger actuator to the pressure in the circumferential fluid passageway.

2. The method of claim 1 including the additional step of forming an actuator cover integral with the annular ring.

3. The method of claim 2 including the steps of clamping a diaphragm between said actuator cover and an actuator housing, thereby forming a pressure chamber between said diaphragm and actuator cover; and
   exposing said pressure chamber to the pressure in the circumferential fluid passageway.

4. In a turbocharger having an exhaust gas driven turbine operably driving a compressor to supply charge air to an engine, an actuator housing comprising:
   an actuator cover integral with a circumferential ring disposed at the compressor end of the turbocharger and affixed to the turbocharger, said actuator cover having at least one bore therein; and
   a generally cup shaped actuator cap having its open end secured within said at least one bore.

5. An actuator housing according to claim 4 wherein said actuator cover has a first bore and a concentric enlarged bore therein with an annular transition section therebetween.

6. An actuator housing according to claim 5 wherein said transition section has a groove therein.

7. An actuator housing according to claim 5 wherein said transition section is S-shaped.

8. An actuator housing according to claim 5 wherein said actuator cap has an outwardly rolled edge.

9. A turbocharged engine system including an engine and a turbocharger having a turbine housing having an inlet and outlet and turbine driven by engine exhaust gases, a compressor housing having an inlet and outlet and a compressor driven by the turbine to draw in air for supply to the engine, an annular ring member mounted to said compressor housing having an integral actuator cover, means forming a bypass flow path for bypass passage of exhaust gases around the turbine, a control actuator having a pressure chamber therein, means for opening and closing the bypass flow path, and means for transporting a control pressure from said compressor outlet to said actuator pressure chamber, said means for transporting comprising:

- a compressor housing passage internal of said compressor housing and flow connected to said compressor outlet;
- an annular circumferential passage formed by and internal of said compressor housing and said annular ring member flow connected to said compressor housing passage; and
- an actuator cover passage internal of said actuator cover and flow connected to said annular passage and said actuator pressure chamber.

10. The turbocharged engine system of claim 9 further including means for securing said annular ring directly to said turbine housing.

11. The turbocharged engine system of claim 10 wherein said means for securing is a plurality of bolts extending through holes in said annular ring and threadable within threaded bores in said turbine housing.

12. The turbocharged engine system of claim 11 wherein said compressor housing is rotatable into a plurality of positions.

13. A turbocharged engine system including an engine and a turbocharger having a turbine housing having an inlet and outlet and a turbine driven by engine exhaust gases therein, a compressor housing having a compressor driven by the turbine to draw in air for supply to the engine therein, means within said turbine housing for forming a bypass flow path for bypass passage of exhaust gases directly from said turbine inlet to said turbine outlet around the turbine, and a waste gate valve for opening and closing the bypass flow path and a turbocharger control actuator, said control actuator comprising:

- an annular ring member having an integral actuator cover having a bore and an enlarged bore therein, with a transition section therebetween;
- a generally cylindrical actuator cap positioned within said enlarged bore of said actuator cover, said actuator cover and said actuator cap cooperating to define an actuator housing;
- a flexible diaphragm mounted within said actuator housing and cooperating therewith to define a pressure chamber;
- an actuator rod having one end for connection to the waste gate valve to control the position thereof, and the other end movably carried with said diaphragm;
- spring means for urging said actuator rod to retain the waste gate valve in a position closing the bypass flow path; and
- means for supplying a control pressure to said pressure chamber to cause movement of said diaphragm to displace said actuator rod for moving the waste gate valve against said spring means to a position opening the bypass flow path, said means located internally of said annular ring and said compressor housing.

14. A turbocharged engine system including an engine and a turbocharger having a turbine housing having an inlet and an outlet and a turbine driven by engine exhaust gases therein, a compressor housing having a compressor driven by the turbine to draw in air for supply to the engine therein, means within said turbine housing for forming a bypass flow path for bypass passage of exhaust gases directly from said turbine inlet to said turbine outlet around the turbine, and a waste gate valve for opening and closing the bypass flow path, a pressure chamber therein for controlling the waste gate valve, a method of transporting a control pressure from said compressor to said actuator comprising the steps of:

- forming a passage within said compressor housing;
- forming an annular groove about the compressor housing, said groove in flow communication with said passage in said compressor housing;
- securing an annular ring having an integral actuator cover and defining a passage in flow communication with said actuator pressure chamber to the turbocharger, at the compressor housing end of the turbocharger, said ring and said compressor housing defining an annular passage in flow communication with said actuator cover passage and said compressor housing passage.

15. The method of claim 14 further including the step of rotating said compressor housing to the desired position before the step of securing the annular ring to said turbocharger.

16. The method of claim 15 wherein said annular groove is formed in said compressor housing.

17. The method of claim 15 wherein said annular groove is formed in said annular ring.

* * * * *